United States Patent [19]

Iizuka et al.

[11] Patent Number: 4,720,079
[45] Date of Patent: Jan. 19, 1988

[54] DIAPHRAGM AND FABRICATION METHOD THEREOF

[75] Inventors: Naomichi Iizuka; Motoyuki Suzuki; Toshiyuki Hosohara, all of Toyota, Japan

[73] Assignee: Fuji Polymer Industries Co., Ltd., Nagoya, Japan

[21] Appl. No.: 668,315

[22] Filed: Nov. 5, 1984

[30] Foreign Application Priority Data

May 9, 1984 [JP] Japan .................................. 59-91002

[51] Int. Cl.⁴ ........................................... F16K 31/126
[52] U.S. Cl. .................................... 251/331; 251/61.1; 251/368
[58] Field of Search ............... 251/331, 61.1, 61.2, 251/61, 61.3, 61.4, 61.5, 368; 137/859; 123/568; 264/271.1, 275, 241, 127, 236

[56] References Cited

U.S. PATENT DOCUMENTS 2,707,481 5/1955 McPherson ......................... 251/331
4,141,379 2/1979 Manske ........................... 137/859 X
4,395,462 7/1983 Polmanteer ......................... 428/420

FOREIGN PATENT DOCUMENTS 1046351 12/1958 Fed. Rep. of Germany ..... 251/61.2
 175550  6/1961 Sweden ............................. 251/61.1

Primary Examiner—Robert G. Nilson
Attorney, Agent, or Firm—Robert F. Ziems

[57] ABSTRACT

A diaphragm is formed of a valve member made of a peroxide-curable fluorine-contained rubber and a deformable member made of a fluorosilicone rubber and bonded integrally with the valve member owing to simultaneous curing thereof. It may be fabricated by placing a peroxide-curable fluorine-contained rubber material and a fluorosilicone rubber material in a mold; and then heating and molding the materials simultaneously, thereby bonding the resulting valve member and deformable member into an integral part. A rigid plate may be embedded between the valve member and deformable member. The diaphragm enjoys a low fabrication cost and assures good airtightness without failure.

1 Claim, 7 Drawing Figures

DIAPHRAGM AND FABRICATION METHOD THEREOF

BACKGROUND OF THE INVENTION

1. Field of the Invention

This invention relates to a diaphragm operable and hence functional as a valve by a pressure difference between its front side and its back side, as well as to its fabrication method.

2. Description of the Prior Art

When controlling the operation of an engine or the like, it is generally required to detect pressures at some different points for either opening or closing desired gas flow passages. Rubber-made diaphragms are used for the above-mentioned control.

In the so-called emission gas recirculation system (hereinafter abbreviated as "EGR" for the sake of simplification) of a car engine for example, so-called EGR modulator 4 and EGR valve 5 are provided between an intake side 1A of an engine 1 with which an intake system 2 including a carburetor communicates and an outlet side 1B of an engine 1 leading to an exhaust system 3 as shown in FIG. 1. The EGR modulator 4 is equipped with a diaphragm 6, which is normally separated by the action of a spring (not shown) from an intake port 7 communicating with the intake side 1A so that the intake port 7 is normally kept open to maintain the intake side 1A in communication with an air intake port 8 which leads to the atmosphere. When the pressure in the intake side 1A has dropped and the pressure in the outlet side 1B has conversely gone up, the diaphragm 6 is pushed upwardly to close the intake port 7 so that the introduction of air from the atmosphere becomes no longer available. On the other hand, the EGR valve 5 has a diaphragm 9. This diaphragm 9 generally closes an intake port 10 which communicates with the outlet side 1B. When the pressure in the intake side 1A and outlet side 1B have respectively decreased and increased and further intake of air has been stopped by the EGR modulator 4, the diaphragm 9 is however pushed upwardly due to a pressure difference and is thus separated from the intake port 10. This causes the exhaust port 10 to open and hence to communicate to a bypass 11, thereby recirculating a portion of the exhaust gas in the outlet side 1B to the engine 1 by way of the bypass 11 and intake side 1A. 12 denotes a vacuum line.

Such diaphragms, for example, those suitable for use in EGR modules similar to the EGR modulator 4 have hitherto been fabricated for example in the following manner. As shown in FIG. 2, a fluorosilicone rubber was molded and then cured under heat to form a diaphragm main body 22 equipped with a ring-like deformable portion 21 having an arched cross-section. On the side, a fluorine-containing rubber that is, a fluorocarbon rubber, was molded and then cured under heat to form a valve member 23. Then, the valve member 23 was centrally disposed on one side of the diaphragm main body 22, and a retainer plate 24 was provided on the same side of the diaphragm main body 22 to bring the retainer plate 24 into engagement with a flange portion 23a of the valve member 23. In addition, a backup plate 25 was arranged on the other side of the diaphragm main body 22. Thereafter, the valve member 23 and diaphragm main body 22 were held under pressure between the retainer plate 24 and backup plate 25, for example, by causing pins 26 to extend from the retainer plate 24 and through the diaphragm main body 22, and then connecting the pins 26 to the backup plate 25. Numeral 27 indicates a peripheral mounting part of the diaphragm main body 22.

Fluorosilicone rubber is used as a material for the diaphragm main body 22 for the following reasons. This rubber is deformable to a significant extent and, particularly, maintains sufficient deformability even at low temperatures. In addition, it has outstandingly high anti-deformation durability and chemical stability. On the other hand, fluorine containing rubber is used to make up the valve member 23 for the following reasons. Namely, fluorine-containing rubber exhibits very high abrasion and wearing resistance and at the same time, enjoys chemical stability. However, the deformability of fluorine-containing rubber becomes extremely small especially at low temperature, thereby increasing its stiffness. Therefore, fluorine-containing rubber cannot be used as a material for the deformable portion and fluorosilicone rubber cannot be employed as a material for the valve member due to its low abrasion and wearing resistance.

In a diaphragm of the above-mentioned sort, it is necessary to use both fluorosilicone rubber and fluorine-containing rubber in order to simultaneously satisfy both of the required two functions, specifically, the deformability as a diaphragm and durability as a valve member. They cannot however be cured at the same time because their curing systems are different from each other. In the past, it was necessary that the diaphragm main body 22 of a fluorosilicone rubber and the valve member 23 of a fluorine-containing rubber were separately molded and then cured. They were then put together by holding means such as the retainer plate 24 and backup plate 25. That conventional fabrication method was thus accompanied by drawbacks such as a plurality of rubber-made parts had to be completed individually, thereby requiring many fabrication steps; due to need for holding means, the final products became unavoidably heavy; and there was a danger that their airtightness would become insufficient depending on the condition of the connection by the holding means.

SUMMARY OF THE INVENTION

The present invention has been completed with the above-mentioned circumstances in view.

An object of this invention is therefore to provide a light and inexpensive diaphragm which can assure airtightness.

Another object of this invention is to provide a method capable of fabricating such a diaphragm with extreme ease.

In one aspect of this invention, there is thus provided a diaphragm which comprises:

a valve member made of a peroxide-curable rubber fluorine-containing that is, a peroxide curable fluorocarbon rubber; and a deformable member made of a fluorosilicone rubber and bonded integrally with the valve member owing to simultaneous curing thereof.

In another aspect of this invention, there is also provided a method for fabricating a diaphragm equipped with a valve member made of a fluorine-containing rubber and a deformable member made of a fluorosilicone rubber, which method comprises:

placing a peroxide-curable fluorine-containing rubber material and a fluorosilicone rubber material in a mold; and heating and molding the materials simultaneously, thereby bonding the resulting valve member and deformable member into an integral part.

The present invention therefore permits extremely quick fabrication of a diaphram which is constructed of a valve member made of a fluorine-containing rubber and a deformable member made of a fluorosilicone rubber and enjoys light weight and sure airtightness.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENTS

Figure 1:
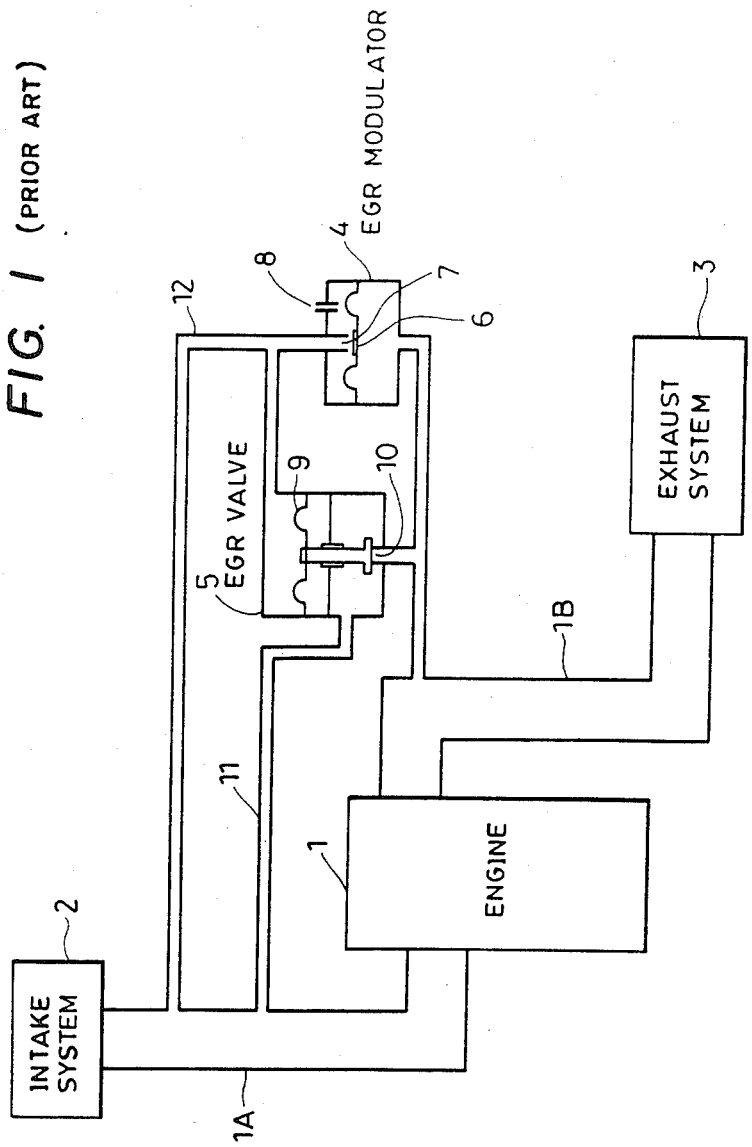
FIG. 1 is a schematic illustration of an emission gas recirculation system for a car engine.
Figure 2:
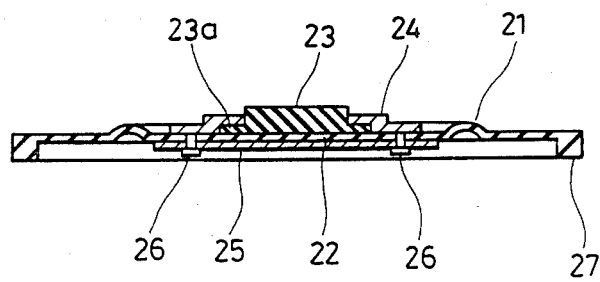
FIG. 2 is a cross-sectional view of one example of conventional diaphragms.
Figure 3:
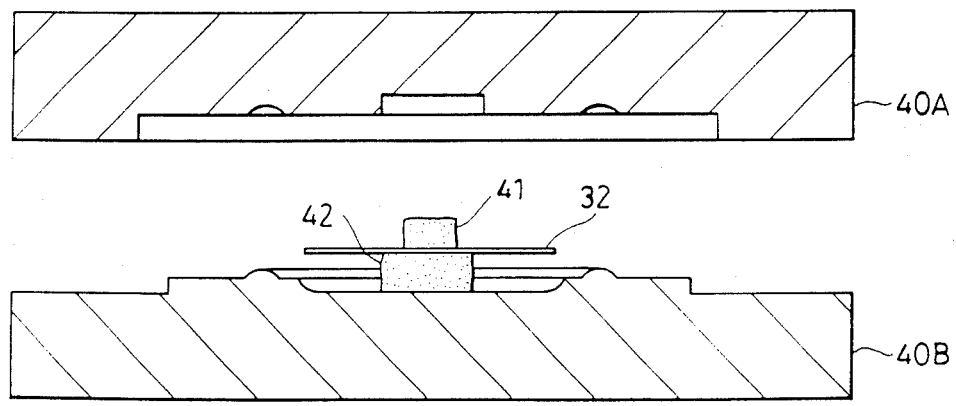
FIG. 3 illustrates in cross-section one example of the diaphragm fabrication method according to this invention.
Figure 4A:
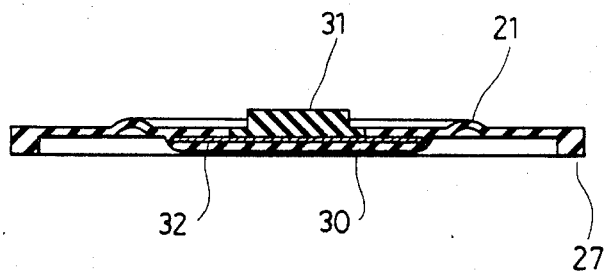
FIGS. 4a and 4b are a cross-sectional view and a perspective view, respectively, of a diaphragm fabricated in accordance with the method depicted in FIG. 3.
Figure 4B:
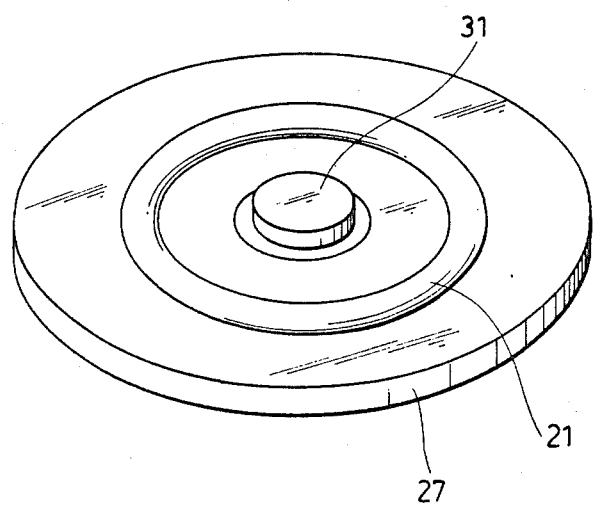

Referring first to FIG. 3 of the accompanying drawings, disposed in a superposed fashion in the diaphragm molding cavities of molds 40A, 40B are an unvulcanized fluorine-containing rubber, or fluorocarbon rubber, block 41 containing a peroxide vulcanizing agent, a rigid plate 32 and an unvulcanized fluorosilicone rubber block 42 containing the same peroxide vulcanizing agent as that contained in the fluorine-contained rubber block 41. Then, the molds 40A, 40B are closed to heat the contents under pressure. The fluorine-containing rubber block 41 and fluorosilicone rubber block 42 are thus melted to flow within the mold cavities, thereby filling up the mold cavities. Here, the fluorine-containing rubber and fluorosilicone rubber are bonded together along their boundary into an integral part. At the same time, both rubbers are vulcanized. It is thus possible to obtain, as illustrated in FIGS. 4a and 4b, a diaphragm according to the present invention in which the valve member 31 made of the fluorine-containing rubber and a diaphragm main body 30 having the deformable member 21 made of the fluorosilicone rubber are bonded together into an integral part with the rigid plate 32 embedded therebetween.

In the above-described fabrication method, the individual rubber materials may be separately extruded into the mold cavities by the transfer molding technique.

As an exemplary fluorosilicone rubber material useful in the practice of this invention, may be mentioned a mixture obtained by adding such additives as fumed silica and pigments whenever necessary or desired, and as a vulcanizing agent, the same peroxide as that employed as a vulcanizing agent in the fluorine-containing rubber to polymethyl-vinyl-trifluoro-propyl-siloxane having the below-described structural formula ["SHLS-63u" (trade name; product of Toray Silicone Inc., Japan) may be mentioned as a commercial product] which may optionally contain polydimethylsiloxane in a suitable amount.

Structural formula

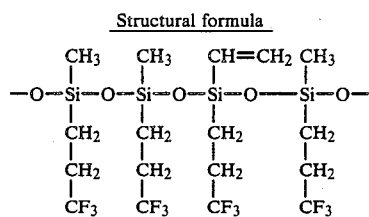

Such a fluorosilicone rubber material is hardened when heat is applied thereto, because the peroxide, a vulcanizing agent, generates radicals and the resultant radicals activate vinyl groups of the polysiloxane to cause a cross-linking reaction. The following are the mechanisms of the cross-linking reaction shown by way of examples.

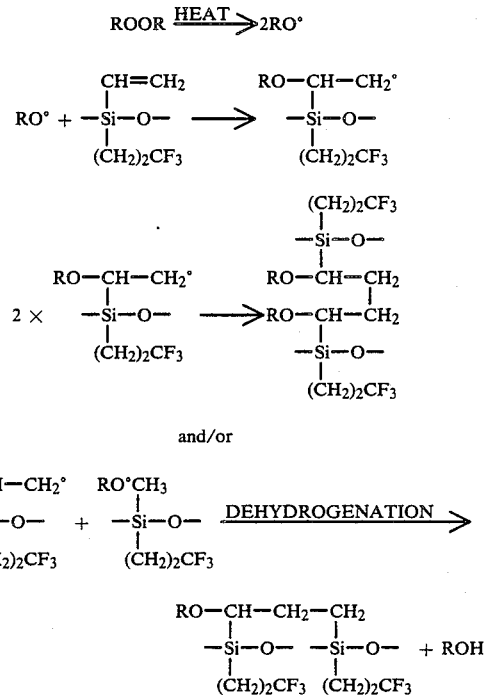

Illustrative of the fluorine-containing rubber material useful in the practice of this invention may include a mixture obtained by incorporating optional additives such as a carbon black and the like, a vulcanizing agent such as 2,5-dimethyl-2,5-di(tert-butylperoxy)hexane and acid scavengers such as triallylisocyanurate and a polyol in a fluorine-containing rubber polymer formed of a vinylidene fluoride-hexanefluoropropene copolymer which contains iodine atoms coupled it the ends of the claims thereof [as commercial products, may for example be mentioned "DAIEL G901" and "DAIEL G801" produced by Daikin Industries, Ltd.]. Since the iodine atoms of the vinylidene fluoride-hexanefluoropropene copolymer are activated by radicals, its curing may be achieved by using a peroxide as a vulcanizing agent without need for combined use of a curing accelerator such as calcium hydroxide. As a fluorine-containing rubber, a fluorine-contained rubber formed of a vinylidene fluoride-hexanefluoropropene copolymer which contains bromine atoms is generally used. The curing of such a fluorine-containing rubber may proceed to a significant extent when a polyamine or polyol is used as its vulcanizing agent. However, this may not be the case when a peroxide is used as its vulcanizing agent. For this reason, the curing of such a fluorine-containing rubber is often carried out using calcium hydroxide as a curing accelerator. However, the inclusion of calcium hydroxide deteriorates the acid resistance of the resultant fluorine-containing rubber to a considerable extent.

On the other hand, polyphenylene sulfide may for example be used to form the rigid plate 32. Where rigid plate 32 is made of polyphenylene sulfide, the curing may be effected at 170°-200° C. and for 5-30 minutes.

In the present invention, curing agents requiring 150° C. or higher such as t-butyl peroxybenzoate and dicumyl peroxide may also be used as preferred vulcanizing agents, besides the above-described vulcanizing agent.

As has been described above, the present invention employs, as the fluorine-containing rubber material making up the valve member 31, a fluorine-containing rubber which is curable by a peroxide vulcanizing agent forming the same curing system as that employed for the fluorosilicone rubber making up the diaphragm main body 30. Therefore, the molding and curing operations which are required to form the diaphragm main body 30 and valve member 31 can be carried out at the same time in the same molds. This permits the provision of a diaphragm in which the diaphragm main body 30 and the valve member 31 are bonded together firmly into an integral part. The above fabrication method can be carried out, practically, as a one-stop process. Therefore, the above fabrication method is extremely simple and the fabrication cost of the resultant diaphragm is low. Since the diaphragm main body 30 and valve member 31 are joined together in an integral part in the diaphragm of this invention, the diaphragm is free from possible danger that its airtightness would be lost or otherwise reduced. Furthermore, the diaphragm of this invention does not require any holding means, thereby lowering its overall weight. It is extremely easy to bury the rigid plate 32 in rubber in the present invention, thereby facilitating the fabrication of a diaphragm having sufficient stiffness and hence great overall strength. It is feasible to apply a suitable surface treatment to the rigid plate 32 so that the fluorine-containing rubber and fluorosilicone rubber are both baked to the rigid plate to enhance the mutual connection between the rigid plate 32 and the diaphragm main body 30 and valve member 31.

Figure 5:
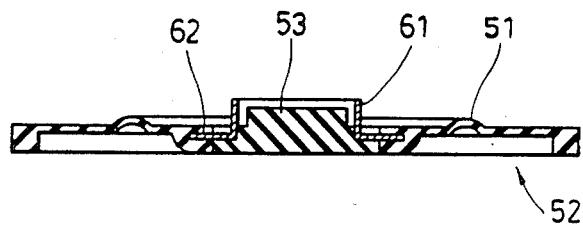
FIG. 5 is a cross-sectional view of a diaphragm according to a further embodiment of this invention.
Figure 6:
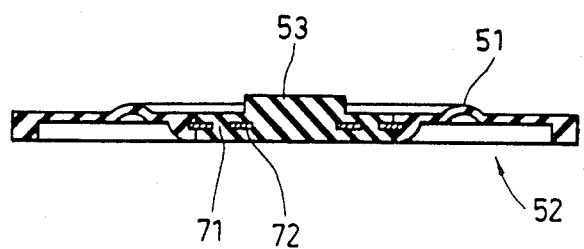
FIG. 6 is a cross-sectional view of a diaphragm according to a still further embodiment of this invention.

The invention has been described on the basis of one embodiment of this invention. It should however be borne in mind that diaphragms of various different structures may also be fabricated in the present invention. As illustrated by way of example in FIGS. 5 and 6, a diaphragm may be fabricated by making a peripheral portion 52 equipped with a deformable portion 51 having a thin plate-like cross-section with a fluorosilicone rubber, forming a central portion 53 as a valve member with a fluorine-containing rubber. As shown in FIG. 5, a ring-like rigid plate 62 having an upright inner peripheral edge 61 may be arranged with the peripheral edge 61 protruding at its tip portion above the rubber face. Alternatively, a rigid plate 72 defining a through-hole 71 may be embedded in rubber as depicted in FIG. 6. Diaphragms of other structures may also be fabricated in the same way as those described above by way of example.

The fluorine-containing rubber and fluorosilicone rubber to be used in the present invention are not necessarily limited to any specific types or any specific combinations of types so long as they can be heated, molded and cured simultaneously in the same molding step.

Having now fully described the invention, it will be apparent to one of ordinary skill in the art that many changes and modifications can be made thereto without departing from the spirit or scope of the invention as set forth herein.

What is claimed is:

1. A diaphragm for a gas flow control device having an intake side and an outlet side in an emission gas recirculation system of a vehicle comprising:

a deformable member for separating the intake side of the flow control device from the outlet side, said deformable member being made of a fluorosilicone rubber curable by a peroxide;

a valve member made of a fluorocarbon rubber curable by the same peroxide by which the fluorosilicone rubber of the deformable member is curable so as to permit simultaneous curing of said deformable member and said valve member, said valve member being integrally bonded to said deformable member as a result of a simultaneous curing; and a rigid plate at least part of which is embedded in the valve member and in a part of the deformable member in such a way that the valve member and deformable member are isolated from each other by said at least part of the plate, and wherein said plate includes an upright inner peripheral edge which protrudes above the valve member.

* * * * *